(12) United States Patent
Nakamura et al.

(10) Patent No.: US 10,704,608 B2
(45) Date of Patent: Jul. 7, 2020

(54) SHAFT COUPLING STRUCTURE

(71) Applicants: TOGO SEISAKUSYO CORPORATION, Aichi (JP); TOYOTA JIDOSHA KABUSHIKI KAISHA, Toyota-shi (JP)

(72) Inventors: Yuji Nakamura, Aichi (JP); Hirofumi Kurachi, Aichi (JP); Akitaka Ichikawa, Toyota (JP)

(73) Assignees: TOGO SEISAKUSYO CORPORATION, Aichi (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 321 days.

(21) Appl. No.: 15/747,078

(22) PCT Filed: Jul. 26, 2016

(86) PCT No.: PCT/JP2016/071847
§ 371 (c)(1),
(2) Date: Jan. 23, 2018

(87) PCT Pub. No.: WO2017/026274
PCT Pub. Date: Feb. 16, 2017

(65) Prior Publication Data
US 2018/0372164 A1    Dec. 27, 2018

(30) Foreign Application Priority Data

Aug. 7, 2015    (JP) ................................. 2015-157755

(51) Int. Cl.
*F16D 7/02* (2006.01)
*F16D 1/08* (2006.01)
(Continued)

(52) U.S. Cl.
CPC ............ *F16D 7/021* (2013.01); *F16C 35/073* (2013.01); *F16D 1/0835* (2013.01); *F16F 15/0237* (2013.01); *Y10T 403/7061* (2015.01)

(58) Field of Classification Search
CPC ...... F16D 7/021; F16D 1/0835; F16C 35/073; Y10T 403/7061; F16F 15/0237
(Continued)

(56) References Cited

U.S. PATENT DOCUMENTS 2,062,290 A * 12/1936 Bott ........................ F16C 17/06
403/372
3,061,386 A    10/1962 Dix et al.
(Continued)

FOREIGN PATENT DOCUMENTS

BE          624354       *  2/1963
DE         3248148          7/1984
(Continued)

OTHER PUBLICATIONS

International Search Report dated Sep. 27, 2016 from International Application No. PCT/JP2016/071847.
(Continued)

*Primary Examiner* — Greg Binda
(74) *Attorney, Agent, or Firm* — Beyer Law Group LLP

(57) ABSTRACT

A shaft coupling structure includes a shaft, a sleeve, into which the shaft is inserted, and a tolerance ring. The tolerance ring includes a cylindrical main body and a plurality of protuberances, which protrudes outward in a radial direction from an inner circumferential surface of the main body. The tolerance ring is fitted between an outer circumferential surface of the shaft and an inner circumferential surface of the sleeve. A communication passage that
(Continued)

connects an inside and an outside of each protuberance is provided between the outer circumferential surface of the shaft and the main body.

4 Claims, 8 Drawing Sheets

(51) Int. Cl.
*F16C 35/073* (2006.01)
*F16F 15/023* (2006.01)

(58) Field of Classification Search
USPC ................. 464/10, 41, 82; 403/372
See application file for complete search history.

(56) References Cited

U.S. PATENT DOCUMENTS

| | | | | |
|---|---|---|---|---|
| 3,838,928 A | * | 10/1974 | Blaurock | F16D 1/0835 403/372 |
| 4,569,614 A | * | 2/1986 | Yamauchi | F16D 1/0835 403/372 |
| 6,288,878 B1 | * | 9/2001 | Misso | F16C 27/04 403/372 |
| 8,282,308 B2 | * | 10/2012 | Slayne | F16B 19/02 403/372 |
| 2011/0076096 A1 | * | 3/2011 | Slayne | F16C 27/02 403/372 |
| 2013/0324345 A1 | | 12/2013 | Asakura et al. | |
| 2015/0308511 A1 | | 10/2015 | Asakura et al. | |

FOREIGN PATENT DOCUMENTS

| | | |
|---|---|---|
| EP | 2 532 907 | 12/2012 |
| JP | 2007-210544 | 8/2007 |
| JP | 2012-197927 | 10/2012 |
| JP | 2015-092089 | 5/2015 |

OTHER PUBLICATIONS

International Preliminary Report on Patentability dated Feb. 13, 2018 from International Application No. PCT/JP2016/071847.

* cited by examiner

US 10,704,608 B2

SHAFT COUPLING STRUCTURE

TECHNICAL FIELD

The present invention relates to a shaft coupling structure.

BACKGROUND ART

A type of shaft coupling structure has been known that couples a shaft and a sleeve, into which the shaft inserted, to each other by fitting a tolerance ring between the outer circumferential surface of the shaft and the inner circumferential surface of the sleeve. In such a shaft coupling structure, when the torque transmitted between the shaft and the sleeve exceeds an allowable value, which is determined by the maximum frictional force between the tolerance ring and the shaft or the sleeve, the tolerance ring rotates while slipping on the shaft or sleeve, so that the transmitted torque is limited to be less than or equal to the allowable value.

Patent Document 1 discloses one example of a tolerance ring used in such a shaft coupling structure. The cylindrical main body of this tolerance ring has protuberances, which protrude radially outward. Lubricant for limiting wear caused by slip rotation of the tolerance ring can be stored between the protuberances and the shaft, which is arranged radially inward of the main body.

PRIOR ART DOCUMENT

Patent Document

Patent Document 1: Japanese Laid-Open Patent Publication No. 2012-197927

SUMMARY OF THE INVENTION

Problems that the Invention is to Solve

Wear debris produced by repeated slip rotations of the tolerance ring accumulates between the protuberances of the tolerance ring and the shaft, that is, inside the protuberances. When slip rotation of the tolerance ring occurs with some of the wear debris accumulated inside the protuberances caught between the tolerance ring and the shaft or the sleeve, the wear debris further wears the tolerance ring and the shaft or the sleeve, producing more wear debris. This promotes the wear and thus the generation of wear debris.

This problem also exists in a shaft coupling structure in which, when the holding force between the shaft and the sleeve exceeds the allowable value, slip in the axial direction occurs between the tolerance ring and the shaft or the sleeve, so that the holding force is limited to be less than or equal to the allowable value.

It is an objective of the present invention to provide a shaft coupling structure capable of limiting wear of a tolerance ring in a favorable manner.

Means for Solving the Problems

To achieve the foregoing objective, a shaft coupling structure is provided that includes a shaft, a sleeve, into which the shaft is inserted, and a tolerance ring. The tolerance ring includes a cylindrical main body and a plurality of protuberances, which protrudes outward in a radial direction from an inner circumferential surface of the main body. The tolerance ring is fitted between an outer circumferential surface of the shaft and an inner circumferential surface of the sleeve. A communication passage that connects an inside and an outside of each protuberance is provided between the outer circumferential surface of the shaft and the main body.

To achieve the foregoing objective, another shaft coupling structure is provided that includes a shaft, a sleeve, into which the shaft is inserted, and a tolerance ring. The tolerance ring includes a cylindrical main body and a plurality of protuberances, which protrudes inward in a radial direction from an outer circumferential surface of the main body. The tolerance ring is fitted between an outer circumferential surface of the shaft and an inner circumferential surface of the sleeve. A communication passage that connects an inside and an outside of each protuberance is provided between the inner circumferential surface of the sleeve and the main body.

MODES FOR CARRYING OUT THE INVENTION

First Embodiment

A shaft coupling structure according to a first embodiment will now be described.

Figure 1:
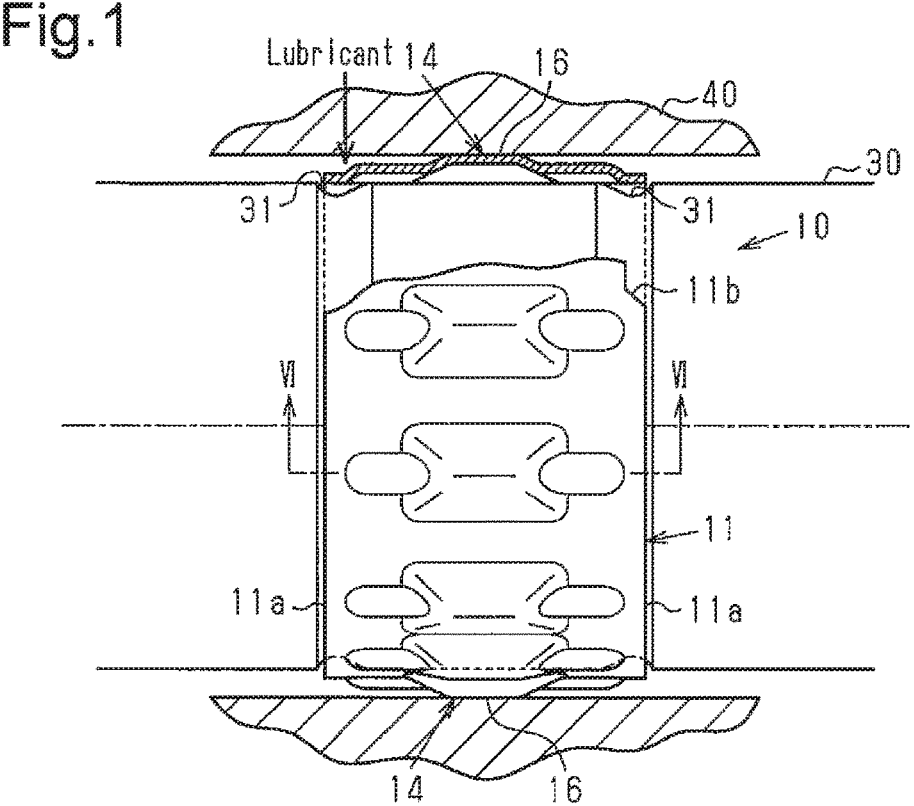
FIG. 1 is a cross-sectional view of a shaft coupling structure.

As shown in FIG. 1, the shaft coupling structure of the present embodiment includes a shaft 30, a sleeve 40 into which the shaft 30 is inserted, and a tolerance ring 10 having a cylindrical main body 11. The tolerance ring 10 is fitted in an elastically deformed state between the outer circumferential surface of the shaft 30 and the inner circumferential surface of the sleeve 40.

The structure of the tolerance ring 10 will now be described.

Figure 2:
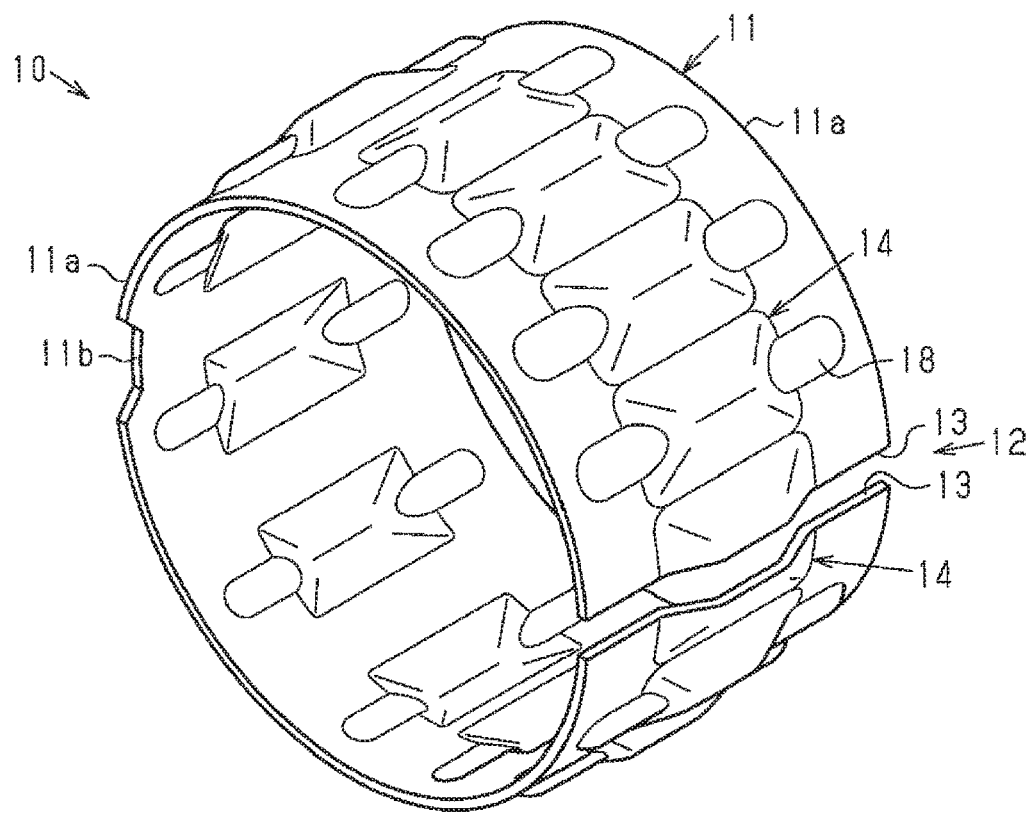
FIG. 2 is a perspective view illustrating a tolerance ring according to a first embodiment.

As shown in FIG. 2, the tolerance ring 10 has a cylindrical main body 11. The main body 11 is formed by bending a rectangular metal plate having long sides and short sides into a cylindrical shape. The main body 11 has two ends 13, which face each other in the circumferential direction of the main body 11. An end gap 12 is provided between the ends 13. The end gap 12 extends in the axial direction of the main body 11.

In the following description, "axial direction" refers to the axial direction of the main body 11, "radial direction" refers to a direction orthogonal to the axial direction, and "circumferential direction" refers to a rotational direction around the axial direction.

Figure 3:
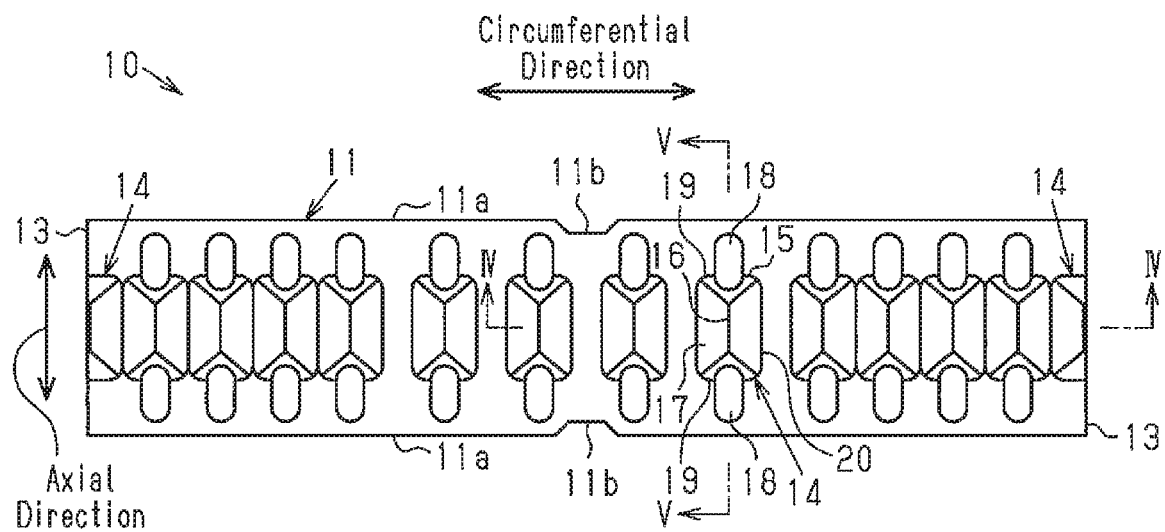
FIG. 3 is a front view showing a developed state of the tolerance ring of the first embodiment.

As shown in FIGS. 2 and 3, the main body 11 has protuberances 14, which protrude radially outward from the radial direction from the inner circumferential surface of the main body 11. Each protuberance 14 has a rectangular shape having an outer shape with long sides and short sides when viewed in the radial direction. The longitudinal direction of the protuberance 14 matches with the axial direction of the main body 11. The protuberances 14 are arranged in a single row in the circumferential direction of the main body 11. The main body 11 has a notch (or a cutout) 11b in each of opposite ends 11a in the axial direction. The notches 11b are located at positions at which the distances from the ends 13 at the opposite sides in the circumferential direction of the main body 11 are substantially equal, that is, at a position that is separated from the end gap 12 by 180°. The portion of the main body 11 corresponding to the notches 11b constitutes a short axial-length portion having a shorter axial length than the other sections of the main body 11. Each notch 11b has a trapezoidal shape as viewed in the radial direction.

Also, the spaces between the protuberances 14 are shorter in the vicinity of the end gap 12 than in the other sections. That is, the sixth to ninth protuberances 14 counted from one of the ends 13, which form the end gap 12, are arranged in the circumferential direction with spaces in between. In contrast, the first to fifth protuberances 14 counted from each of the ends 13, which form the end gap 12, are provided continuously in the circumferential direction without spaces in between. That is, the protuberances 14 provided in the vicinity of the end gap 12 are protuberances of one type, which are arranged continuously in the circumferential direction without spaces in between. The protuberances 14 provided in the region farther apart from the end gap 12 in the circumferential direction than the protuberances of the above type are protuberances of another type, which are arranged in the circumferential direction with spaces in between. This structure increases the stiffness of the main body 11 in the vicinity of the end gap 12.

The protuberances 14 will now be described.

Figure 4A:
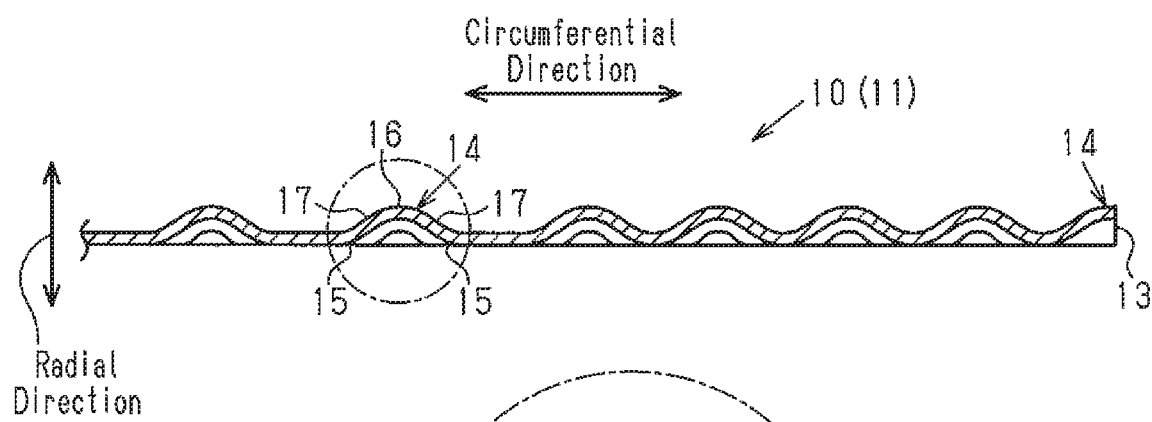
FIG. 4A is a cross-sectional view taken along line IV-IV in FIG. 3.
Figure 4B:
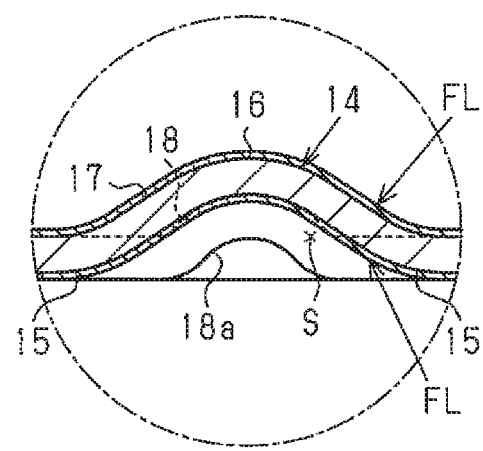
FIG. 4B is a partially enlarged view of FIG. 4A.

As shown in FIGS. 4A and 4B, each protuberance 14 has starting sites (proximal sites) 15 as the starting points of the protruding shape of the protuberances 14. As shown in FIGS. 3 and 5B, the starting sites 15 constitute the outer edges of protuberance 14 when viewed in the radial direction.

In addition, each protuberance 14 has a ridge portion 16 constituted by the highest site, or the outermost site in the radial direction of the main body 11, and the sites in the vicinity of the outermost site. Among the protuberances 14, each of the two protuberances 14 closest to the end gap 12 (hereinafter, particularly referred to as "end-gap protuberances" when necessary), has a ridge portion 16 that is formed by one of the ends 13, which form the end gap 12. The end-gap protuberances are smaller in size than the other protuberances 14 and approximately equal to the size and shape of one of the two divided pieces obtained by dividing one of the other protuberances 14 along the ridge portion 16.

As shown in FIGS. 3 and 4, each protuberance 14 also has rising portions 17 between the starting sites 15 and ridge portion 16. The rising portions 17 extend from the starting sites 15 toward the ridge portion 16 so as to gently slope outward in the radial direction.

The protuberances 14 are each provided with extensions 18, which extend from the opposite ends in the axial direction of the main body 11. The extensions 18 each extend straight from a position midway on the slope of the rising portion 17 toward the end 11a in the axial direction of the main body 11. Specifically, the extension 18 extends to a position before the end 11a. A depression S is defined radially inside of each protuberance 14 by the inner walls of the starting sites 15, the ridge portion 16, the rising portions 17, and the extensions 18. Hereinafter, when distinguishing the protuberances 14 with the extensions 18 from the end-gap protuberances, the former will be referred to as specific protuberances.

Figure 5A:
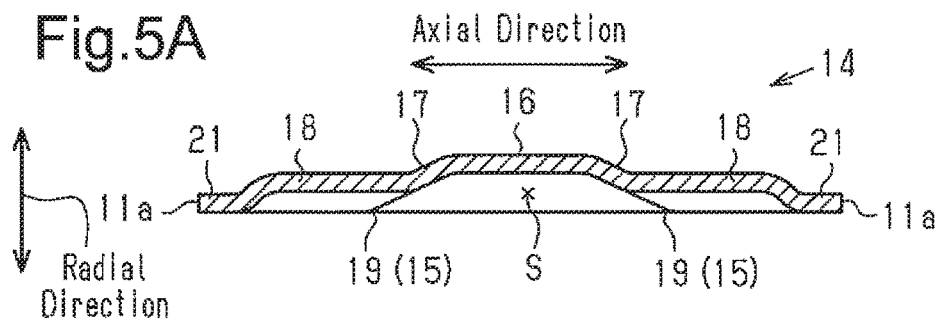
FIG. 5A is a cross-sectional view taken along line V-V in FIG. 3.
Figure 5B:
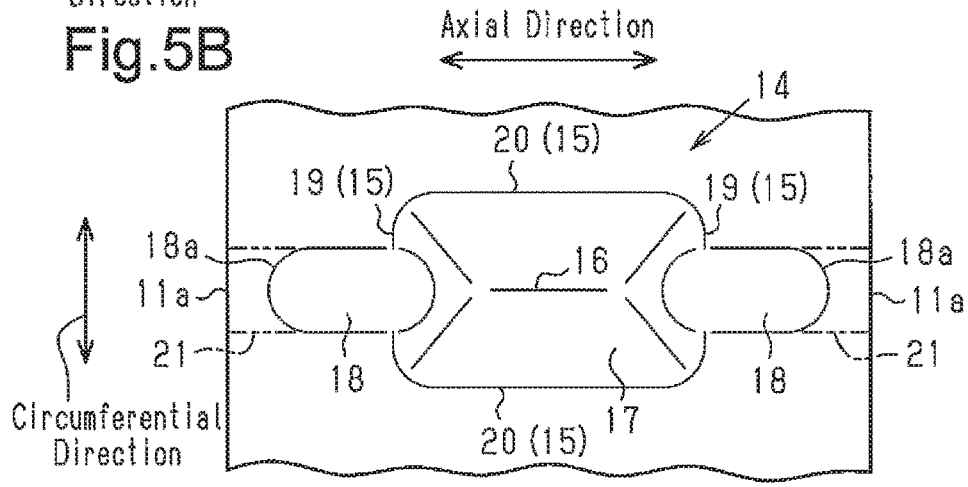
FIG. 5B is a front view of a protuberance as viewed in the radial direction.

As shown in FIGS. 5A and 5B, of the short-side ends 19 and the long-side ends 20 of each specific protuberance, the extensions 18 extend from the short-side ends 19, which are on the opposite sides in the axial direction of the main body 11. The extensions 18 each extend from a position midway on the slope of the rising portion 17 in the main body 11. The length of the extension 18 in the radial direction of the main body 11 is shorter than that of the ridge portion 16. Thus, each specific protuberance includes a first protuberance, which is constituted by a ridge portion 16 and rising portions 17, and second protuberances, which have a height smaller than that of the first protuberance. Each second protuberance is constituted by an extension 18, which is continuous with the first protuberance and extends toward the end 11a of the main body 11.

Further, each extension 18 has an end (a distal end) 18a, which is the starting point of the protrusion of the extension 18. In the main body 11, the site between the end 18a of each extension 18 and the corresponding end 11a on one of the opposite sides in the axial direction of the main body 11 forms a passage site 21, which is located at the radially innermost position in the main body 11.

As shown in the enlarged view of FIG. 4B, the inner side and outer side in the radial direction of the main body 11, that is, the inner circumferential surface and the outer circumferential surface of the main body 11 are each subjected to manganese phosphate coating treatment, which is an antiwear coating treatment.

The steps of the manganese phosphate coating treatment will now be described. First, a degreasing step is performed to remove oil on the inner circumferential surface and the outer circumferential surface of the main body 11 before the coating treatment. Then, a surface conditioning step is performed in which fine irregularities are formed on the inner circumferential surface and the outer circumferential surface of the main body 11, which has undergone the degreasing step. Thereafter, a film forming step is performed to form a manganese phosphate coating layer having a predetermined thickness on the inner circumferential surface and the outer circumferential surface of the main body 11, which has undergone the surface conditioning step. Subsequently, a baking step, or thermal treatment, is performed to dry the main body 11, which has undergone the film forming step, so that the manganese phosphate coating layer is fixed. The baking step is optional. Next, an antirust coating step is performed, in which antirust oil is applied to the inner circumferential surface and the outer circumferential surface of the main body 11, which has undergone the film forming step or the baking treatment step. A manganese phosphate coating FL made of crystals of porous manganese phosphate is formed on the inner circumferential surface and the outer circumferential surface of the main body 11, which has undergone the above steps.

Figure 6A:
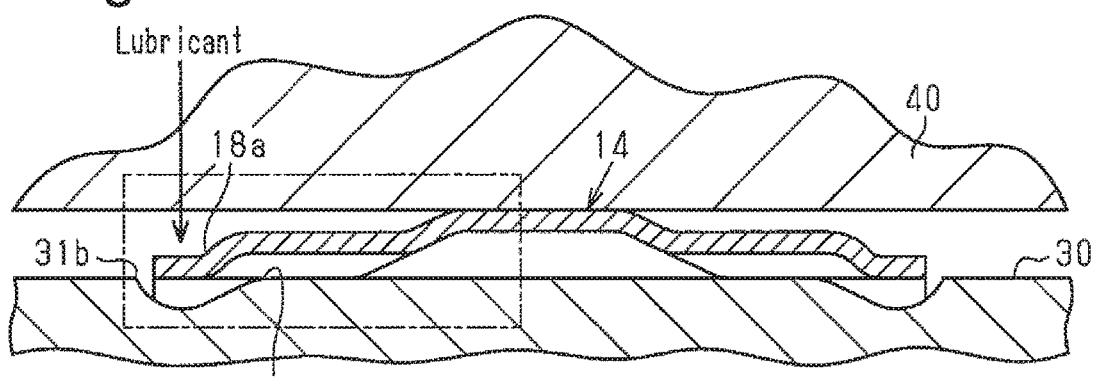
FIG. 6A is a cross-sectional view showing a specific protuberance of the tolerance ring of the first embodiment.
Figure 6B:
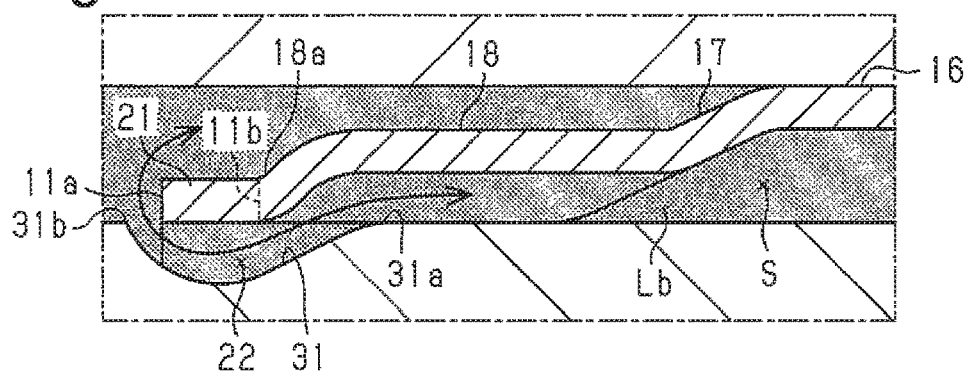
FIG. 6B is a partially enlarged view of FIG. 6A.

The tolerance ring 10 is fitted in an elastically deformed state between the outer circumferential surface of the shaft 30 and the inner circumferential surface of the sleeve 40, into which the shaft 30 is inserted. As shown in FIGS. 6A and 6B, the shaft 30 has two small-diameter portions 31, which have a diameter smaller than that of the other sections. That is, the outer circumferential surface of each small-diameter portion 31 has a groove recessed inward in the radial direction of the shaft 30.

As shown in FIGS. 6A and 6B, the small-diameter portions 31 are arranged so as to face the ends 11*a* in the axial direction of the main body 11. Specifically, each small-diameter portion 31 is arranged such that the passage sites 21 of the specific protuberances are located between ends 31*a* and 31*b* on the opposite sides of the small-diameter portion 31. As a result, the end of each passage site 21, which is connected to the specific protuberance, that is, the end 18*a* of the extension 18 of the specific protuberance, is located between the ends 31*a* and 31*b* of the small-diameter portion 31. The end 18*a* of each extension 18 is located closer to the second end 31*b* than to the first end 31*a* of the small-diameter portions 31. Also, the second end 31*b* of the small-diameter portion 31 is located on the side farther from the specific protuberance than the end 11*a* of the main body 11. That is, the end 18*a* of the extension 18 of the specific protuberance and the end 11*a* of the main body 11 are located between the ends 31*a* and 31*b* of the small-diameter portion 31.

In such a shaft coupling structure, the gap between the outer circumferential surface of the small-diameter portion 31 and the passage site 21 constitutes a communication passage 22, which connects the inside (the depression S) of the specific protuberance and the outside in the radial direction of the specific protuberance. Between the outer circumferential surface of the small-diameter portions 31 and the site of the main body 11 at which the notch 11*b* is provided, a communication port exists that opens wider outward in the radial direction of the main body 11 than the communication passage 22. This communication port connects the inside and the outside in the radial direction of the main body 11.

The operation of the shaft coupling structure of the present embodiment will now be described.

As shown in FIGS. 6A and 6B, in this shaft coupling structure, the ridge portion 16 of the first protuberance in the protuberance 14 is in contact with the inner circumferential surface of the sleeve 40. In contrast, the extension 18, which corresponds to the second protuberance of the protuberances 14, is not in contact with the inner circumferential surface of the sleeve 40.

As shown in the enlarged view of FIG. 6B, between the outer circumferential surface of the shaft 30, to which the tolerance ring 10 is fitted, and the inner circumferential surface of the sleeve 40, lubricant Lb is allowed to flow into and out of the inside of the specific protuberance through the communication passage 22 between the tolerance ring 10 and the shaft 30.

Figure 7:
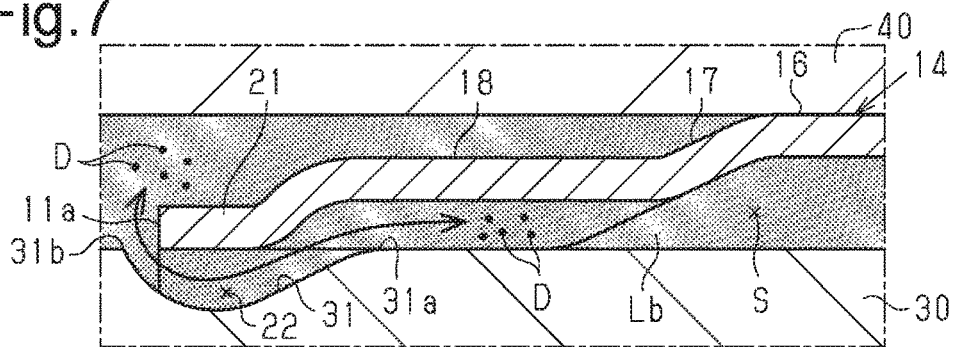
FIG. 7 is an enlarged view showing a specific protuberance of the tolerance ring of the first embodiment.

As shown in FIG. 7, when repetitive slip rotations of the tolerance ring 10 occur between the tolerance ring 10 and the shaft 30, the slip rotations of the tolerance ring 10 produce wear debris D, which tends to accumulate between the tolerance ring 10 and the outer circumferential surface of the shaft 30, especially inside the specific protuberances (the depressions S).

However, as indicated by the arrows in FIG. 7, in the process of the lubricant Lb flowing into or out of the specific protuberance through the communication passage 22, the wear debris D is discharged from the inside of the specific protuberance, for example, to the outside of the specific protuberance.

As the lubricant Lb that has flowed into the specific protuberance is discharged in this manner, the wear debris D, which is generated by repeated slip rotations of the tolerance ring 10, is discharged from the inside of the specific protuberance. Thus, the wear debris D is not easily accumulated in the specific protuberance.

When the communication passage 22 is constituted by the small-diameter portion 31 of the shaft 30 as described above, the length in the axial direction of the small-diameter portion 31 needs to be adjusted, for example, increased, depending on the position and length in the axial direction of the protuberance 14 of the tolerance ring 10.

In the case where the small-diameter portions 31 are provided in the shaft 30, the stiffness of the shaft 30 becomes lower as compared with the case where the small-diameter portions 31 are not provided. Thus, if the length in the axial direction of the small-diameter portion 31 is enlarged, the stiffness of the shaft 30 is further reduced. For the protuberance 14, a desired compressive load is set in advance as compressive load acting on the ridge portion 16 of the protuberance 14 from the shaft 30. Therefore, if such a section including the ridge portion 16 is enlarged toward the end 11*a* in the axial direction of the main body 11, the compressive load acting on the ridge portions 16 from the shaft 30 deviates from the initial setting.

In this respect, in the present embodiment, each specific protuberance includes a first protuberance, which is constituted by a ridge portion 16 and rising portions 17, and second protuberances, which have a height smaller than that of the first protuberance. Each second protuberance is constituted by an extension 18, which is continuous with the first protuberance and extends toward the end 11*a* of the main body 11.

By providing such extensions 18 (the second protuberances), it is possible to adequately maintain the range in which the ridge portions 16 of the specific protuberances contact the shaft 30, and the length in the axial direction of the small-diameter portions 31 of the shaft 30 does not need to be increased.

The present embodiment achieves the following advantages.

(1) By introducing and discharging the lubricant Lb into and out of the specific protuberances through the communication passages 22 between the tolerance ring 10 and the shaft 30, the wear debris D produced by repeated slip rotations of the tolerance ring 10 is discharged from the inside of the specific protuberances, so that the wear debris D will not easily accumulate therein. As a result, further generation of wear debris D will be limited, so that wear of the tolerance ring 10 is suppressed in a favorable manner.

(2) Each specific protuberance includes a first protuberance, which has a ridge portion 16 and rising portions 17, and second protuberances, which each have an extension 18. Thus, it is possible to adequately maintain the range in which the ridge portions 16 of the specific protuberances contact the shaft 30, and the length in the axial direction of the small-diameter portions 31 of the shaft 30 does not need to be increased. Accordingly, it is possible to properly maintain the initial setting of the compressive load acting on the ridge portions 16 from the shaft 30, while limiting the decrease in the stiffness of the shaft 30.

(3) The manganese phosphate coating FL is provided on the inner circumferential surface and the outer circumferential surface of the main body 11. This further suppresses the wear of the tolerance ring 10 and thus prevents the allowable torque value from being reduced during the use of the tolerance ring 10.

Second Embodiment

A tolerance ring 110 according to a second embodiment will now be described. Three digit numerals are given to the components of the second embodiment. The components that correspond to the components of the first embodiment are given reference numerals whose last two digits are the same as the reference numerals assigned to the components of the first embodiment, and redundant explanations are omitted. The components of the following embodiments and modifications are given reference numerals in a same manner.

Figure 8:
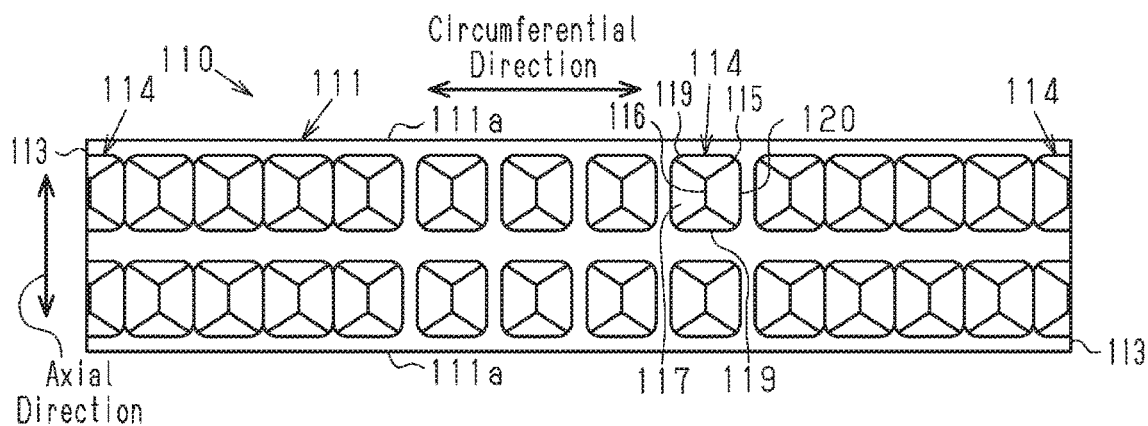
FIG. 8 is a front view showing a developed state of a tolerance ring of a second embodiment.

As shown in FIG. 8, in the present embodiment, two rows of the protuberances 114 arranged in the circumferential direction of the main body 111 are arranged in the axial direction of the main body 111. Two protuberances 114 lined up in the axial direction of the main body 111 are separated from each other. The protuberance 114 is constituted by starting sites 115, a ridge portion 116, and rising portions 117 in between. In the present embodiment, the protuberances 114 other than the end-gap protuberances are referred to as specific protuberances.

Figure 9A:
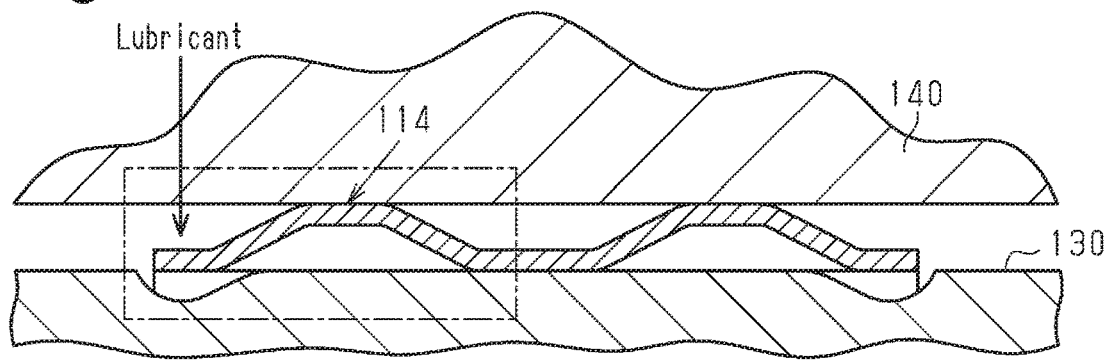
FIG. 9A is a cross-sectional view showing a specific protuberance of the tolerance ring of the second embodiment.
Figure 9B:
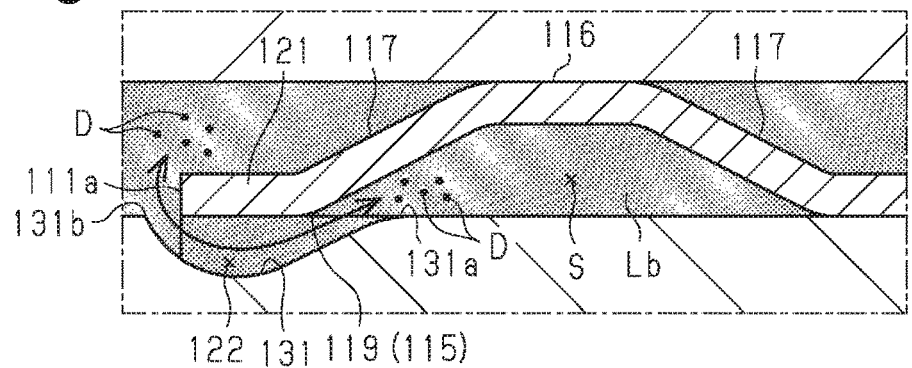
FIG. 9B is a partially enlarged view of FIG. 9A.

As shown in FIGS. 9A and 9B, a passage site 121 is provided between the short-side end 119 of each specific protuberance and the end 111a of the main body 111. Each small-diameter portion 131 corresponds to one of the rows of the specific protuberances arranged in the axial direction of the main body 111. The small-diameter portion 131 is arranged such that the passage site 121 of a specific protuberance in the corresponding row is located between its opposite ends 131a, 131b in the axial direction. As a result, the end of each passage site 121, which is connected to the specific protuberance, that is, the short-side end 119 of the specific protuberance, is located between the ends 131a and 131b of the small-diameter portion 131. The short-side end 119 is located closer to the second end 131b than to the first end 131a of the small-diameter portions 131. Also, the second end 131b of the small-diameter portion 131 is located on the side farther from the specific protuberance than the end 111a of the main body 111. That is, the short-side end 119 of the specific protuberance and the end 111a of the main body 111 are located between the ends 131a and 131b of the small-diameter portion 131.

In such a shaft coupling structure, the gap between the outer circumferential surface of the small-diameter portion 131 and the passage site 121 constitutes a communication passage 122, which connects the inside (the depression S) of the specific protuberance and the outside in the radial direction of the specific protuberance.

As the lubricant that has flowed into the specific protuberance is discharged in this manner, the wear debris D, which is generated by repeated slip rotations of the tolerance ring 110, is discharged from the inside of the specific protuberance via the communication passage 122, as indicated by the arrow in the enlarged view of FIG. 9B. Thus, the wear debris D is not easily accumulated in the specific protuberance.

As described above, the present embodiment achieves the following advantage in addition to the advantages equivalent to the advantages (1) and (3) of the first embodiment.

(4) The present embodiment does not employ the extensions 118 employed in the first embodiment. When used in combination with the shaft 130, which has the small-diameter portions 131, even the thus constructed tolerance ring 110 of the present embodiment can provide the communication passage 122 between the tolerance ring 110 and the shaft 130 with the small-diameter portions 131. This allows the wear debris D to be discharged from inside the specific protuberances and makes it difficult for the wear debris D to be accumulated in the specific protuberances. Therefore, in the case where the tolerance ring 110 is used in combination with the shaft 130 provided with the small-diameter portions 131, the flexibility of design is increased and the design can be made easier.

Third Embodiment

A tolerance ring 210 according to a third embodiment will now be described.

Figure 10:
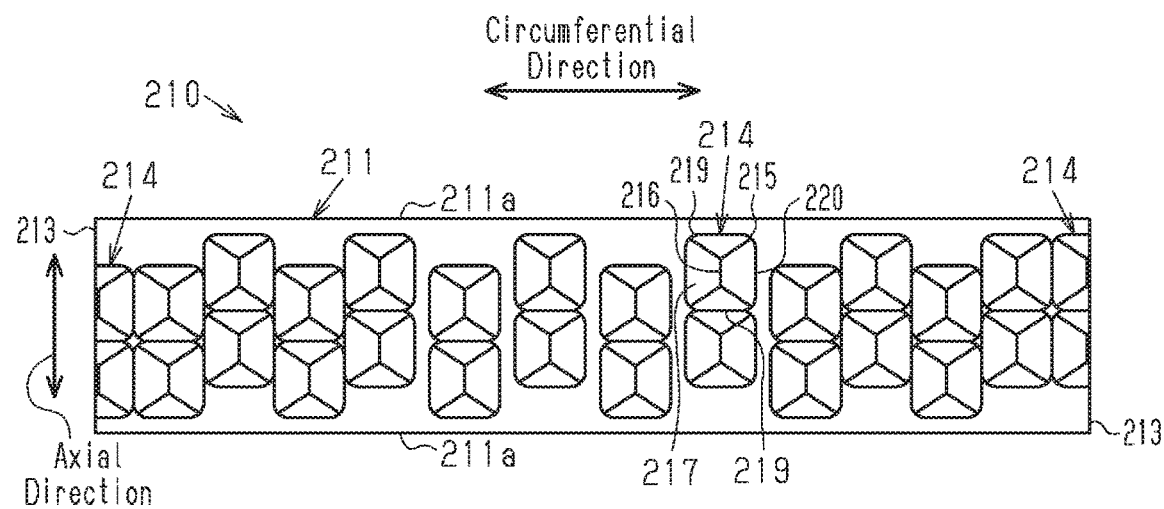
FIG. 10 is a front view showing a developed state of a tolerance ring of a third embodiment.

As shown in FIG. 10, the protuberances 214 of the present embodiment are arranged in the circumferential direction of the main body 211 such that two are aligned in the axial direction of the main body 211. Also, adjacent ones of the protuberances 214 in the circumferential direction of the main body 211 are arranged in a staggered manner in the axial direction. That is, each adjacent pair of the protuberances 214 in the circumferential direction are arranged offset from each other in the axial direction. This structure disperses, in the axial direction, sections where the surface pressure is likely to act between the tolerance ring 210 and the shaft 230 or the sleeve 240, thereby reducing wear of the tolerance ring 210. The protuberances 214 of the present embodiment are each constituted by starting sites 215, a ridge portion 216, and rising portions 217 in between. Two protuberances 214 lined up in the axial direction of main body 211 are connected by starting sites 215 (short-side ends 219). In the present embodiment, each protuberance 214 that is not the end-gap protuberance and is closer to the end 211a of the main body 211 in each pair of the protuberances 214 arranged in the axial direction of the main body 211 is referred to as a specific protuberance.

Figure 11A:
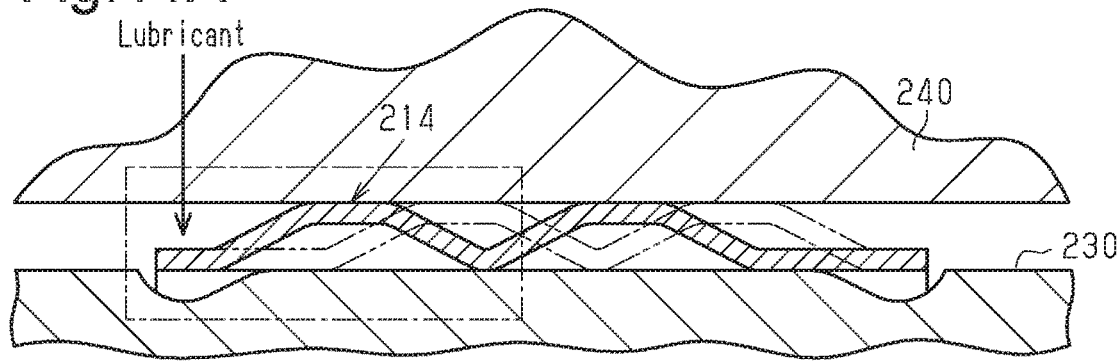
FIG. 11A is a cross-sectional view showing a specific protuberance of the tolerance ring of the third embodiment.
Figure 11B:
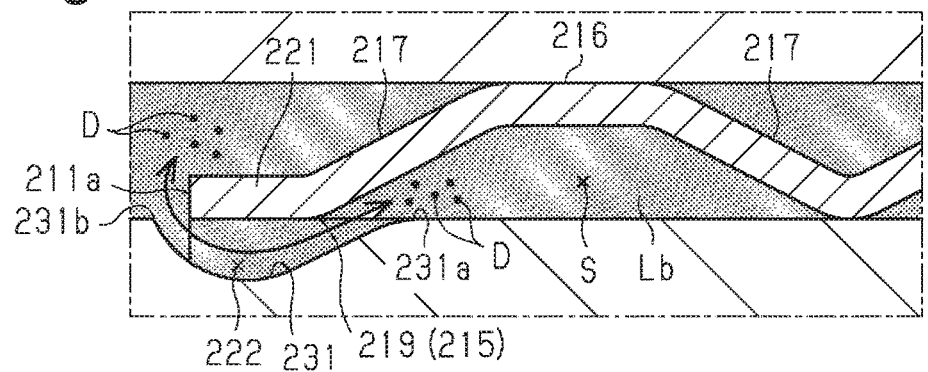
FIG. 11B is a partially enlarged view of FIG. 11A.

As shown in FIGS. 11A and 11B, a passage site 221 is provided between the short-side end 219 of each specific protuberance and the end 211a of the main body 211. Each small-diameter portion 231 is arranged such that the passage sites 221 of the specific protuberances are located between ends 231*a* and 231*b* on the opposite ends in the axial direction. As a result, the end of each passage site 221, which is connected to the specific protuberance, that is, the short-side end 219 of the specific protuberance, is located between the ends 231*a* and 231*b* of the small-diameter portion 231. The short-side end 219 is located closer to the second end 231*b* than to the first end 231*a* of the small-diameter portions 231. Also, the second end 231*b* of the small-diameter portion 231 is located on the side farther from the specific protuberance than the end 211*a* of the main body 211. That is, the short-side end 219 of the specific protuberance and the end 211*a* of the main body 211 are located between the ends 231*a* and 231*b* of the small-diameter portion 231.

In such a shaft coupling structure, the gap between the outer circumferential surface of the small-diameter portion 231 and the passage site 221 constitutes a communication passage 222, which connects the inside (the depression S) of the specific protuberance and the outside in the radial direction of the specific protuberance.

As the lubricant that has flowed into the specific protuberance is discharged in this manner, the wear debris D, which is generated by repeated slip rotations of the tolerance ring 210, is discharged from the inside of the specific protuberance via the communication passage 222, as indicated by the arrow in the enlarged view of FIG. 11B. Thus, the wear debris D is not easily accumulated in the specific protuberance.

As described above, the present embodiment achieves the advantages equivalent to the advantages (1) and (3) of the above-described embodiments.

Each of the above-illustrated embodiments may be modified as follows.

Figure 12:
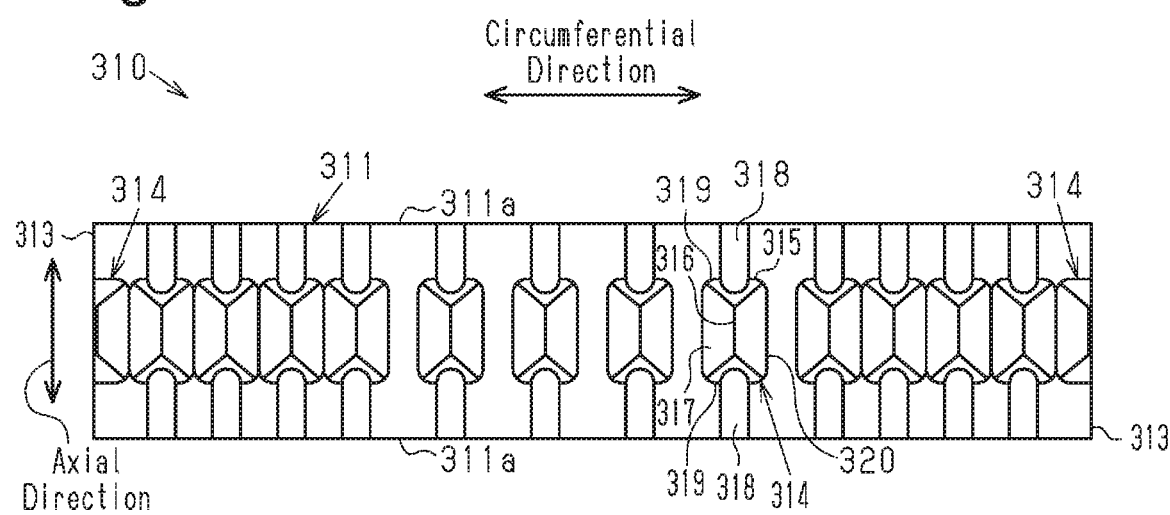
FIG. 12 is a front view showing a developed state of a tolerance ring of a modification.

In a modification to the first embodiment, the extensions 318 of the specific protuberances may be extended to the ends 311*a* on the opposite sides in the axial direction of the main body 311 as shown in FIG. 12. That is, between the protuberances (first protuberances) 314 and each end 311*a* of the main body 311, a recess defined by the inner walls of the extensions (second protuberances) 318 extending from the protuberances (first protuberances) 314 to the end 311*a* of the main body 311 may be provided.

Figure 13A:
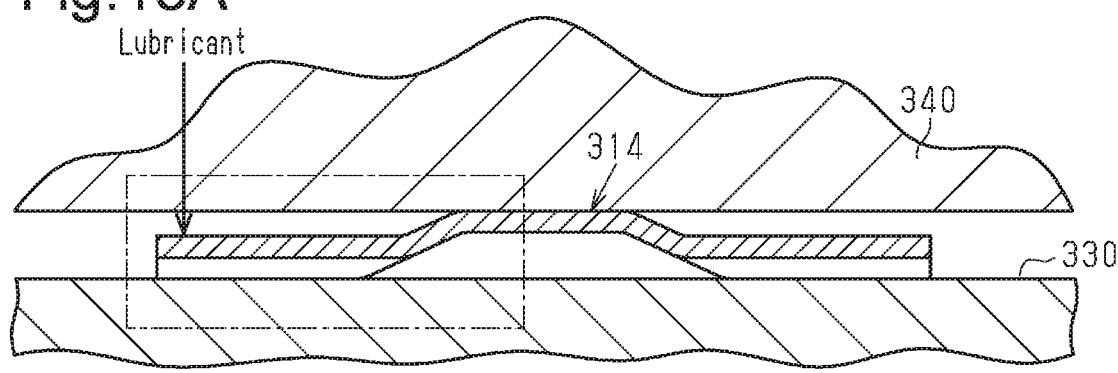
FIG. 13A is a cross-sectional view showing a specific protuberance of a tolerance ring of a modification.
Figure 13B:
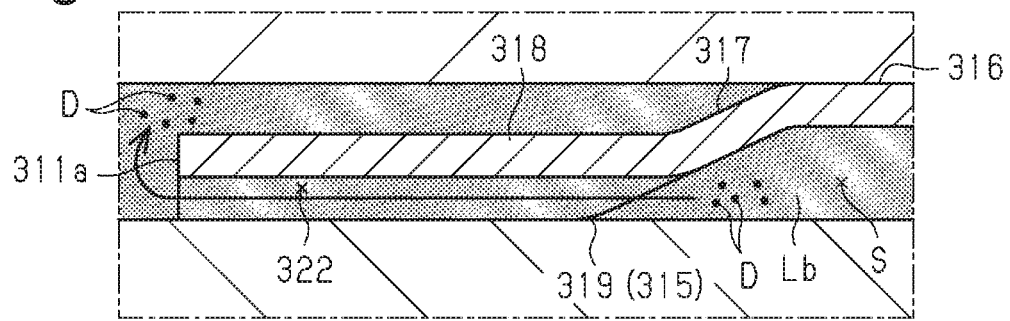
FIG. 13B is a partially enlarged view of FIG. 13A.

In the modification of FIG. 12, it is possible to employ a shaft 330 having a constant diameter (without small-diameter portions 331) as shown in, for example, FIGS. 13A and 13B. In this case, the gap between the outer circumferential surface of the shaft 330 and the inner surface of the extensions 318 of the specific protuberance constitutes a communication passage 322 connecting the inside (depression S) of the specific protuberance with the outside in the radial direction of the specific protuberances. If repeated slip rotations of the tolerance ring 310 occur between the tolerance ring 310 and the shaft 330, wear debris D tends to accumulate between the tolerance ring 310 and the outer circumferential surface of the shaft 330, especially inside the specific protuberances (the depressions S). However, as indicated by the arrows in the enlarged view of FIG. 13B, in the process of the lubricant Lb flowing into or out of the specific protuberance through the communication passage 322, the wear debris D is discharged from the inside of the specific protuberance, for example, to the outside of the specific protuberance. This achieves an advantage equivalent to the advantage (1) of the first embodiment. In addition, the present disclosure may be applied to a shaft coupling structure in which the tolerance ring 310 slips in the axial direction on the shaft 330 or the sleeve 340 when the holding force in the axial direction between the shaft 330 and the sleeve 340 exceeds the allowable value.

In the modification of FIG. 12, instead of providing the specific protuberances with the extensions 318, a groove shallower than the thickness of the main body 311 extending from the protuberances 314 to the ends 311*a* of the main body 311 may be formed in the inner circumferential surface of the main body 311, and the communication passage 322 may be provided between the inner surface of the groove and the outer circumferential surface of the shaft 330.

In the above-illustrated embodiments, in the case where slip rotation of the tolerance ring 10, 110, 210, 310 occurs between the sleeve 40, 140, 240, 340 and the tolerance ring 10, 110, 210, 310, a manganese phosphate coating FL may be provided at least on the outer circumferential surface of the main body 11, 111, 211, 311. In contrast, in the case where slip rotation occurs between the shaft 30, 130, 230, 330 and the tolerance ring 10, 110, 210, 310, a manganese phosphate coating FL may be provided at least on the inner circumferential surface of the main body 11, 111, 211, 311.

In the first embodiment, the end-gap protuberance may be provided with extensions so that the inside and outside of the end-gap protuberances communicate with each other in the same way as the specific protuberances.

In the first embodiment, the extensions 18 of the specific protuberances are arranged at the opposite ends in the axial direction of the specific protuberances, but the extensions 18 on one of the sides may be omitted. Also, the specific protuberances may include ones with extensions 18 at both ends and ones with an extension 18 at only one end.

In the first embodiment, the protuberances 14 other than the end-gap protuberances may include ones with extensions 18 and ones without extensions 18.

In the first embodiment, the main body 11 may be provided with two or more notches 11*b*.

In the first embodiment, the notches 11*b* may be omitted from the main body 11.

In the first embodiment, the protuberances 14 that are adjacent to each other in the circumferential direction of the main body 11 may be arranged in a staggered manner in the axial direction as shown in FIG. 10. This structure disperses, in the axial direction, sections where the surface pressure is likely to act between the tolerance ring 10 and the shaft 30 or the sleeve 40, thereby reducing wear of the tolerance ring 10.

In the first embodiment, the small-diameter portions 31 are provided at two positions in the axial direction of the shaft 30, but one of them may be omitted. In this case, it is not necessary to provide extensions 18 on the side not corresponding to the small-diameter portion 31 in the axial direction of the protuberances 14. Also, when sufficient inflow and outflow of the lubricant Lb into and out of each protuberance 14 through the end gap 12 is ensured, the small-diameter portion 31 may be provided at one position so as to face the depressions S of the protuberances 14. In this case, it is not necessary to provide extensions 18 at the protuberances 14 of the tolerance ring 10.

Figure 14:
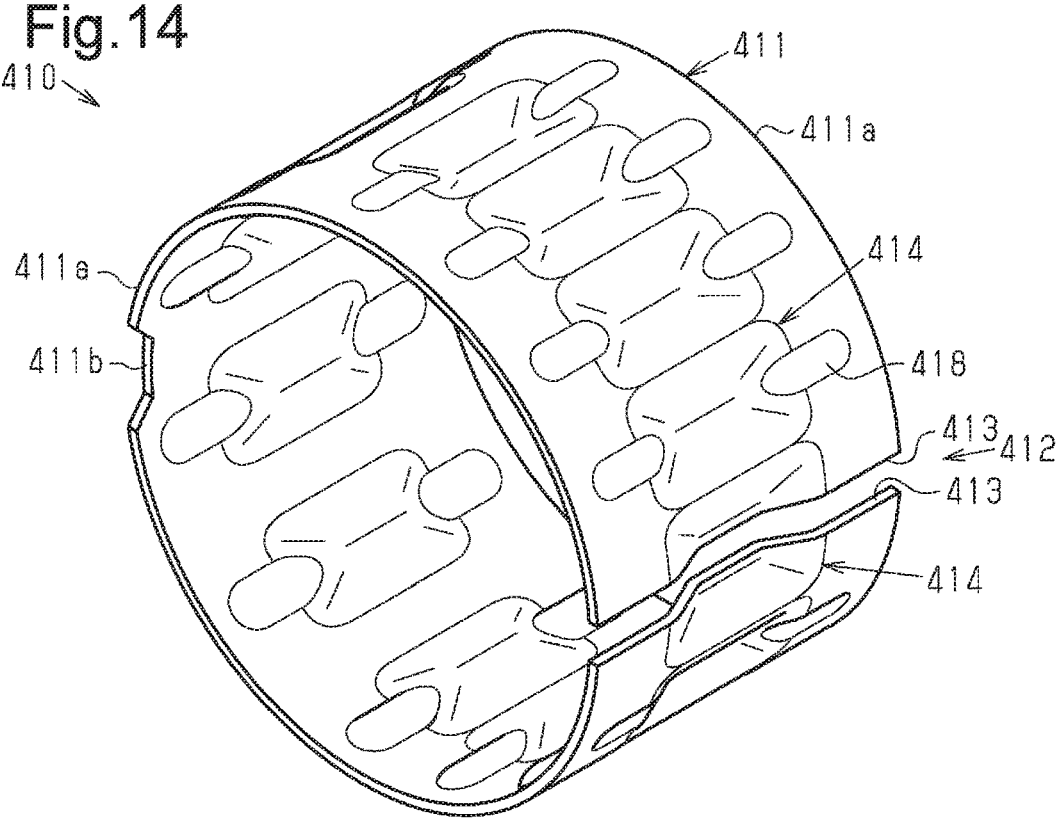
FIG. 14 is a perspective view illustrating a tolerance ring of a modification.
Figure 15A:
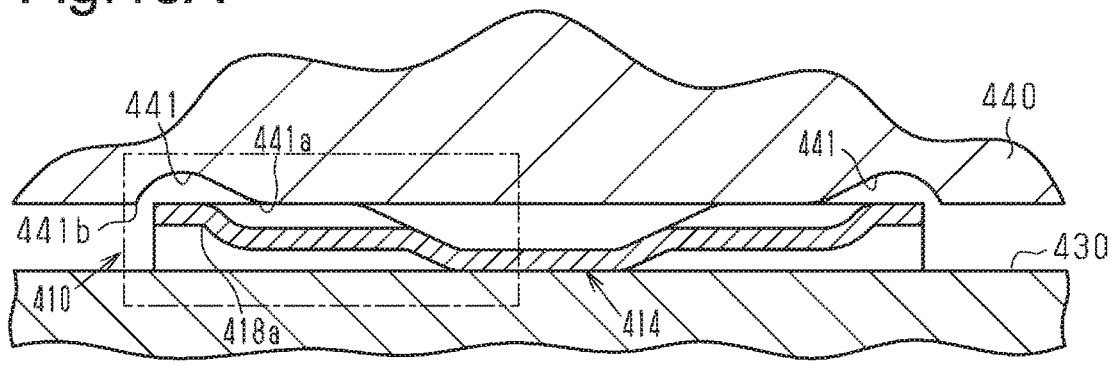
FIG. 15A is a cross-sectional view showing a specific protuberance of a tolerance ring of a modification.
Figure 15B:
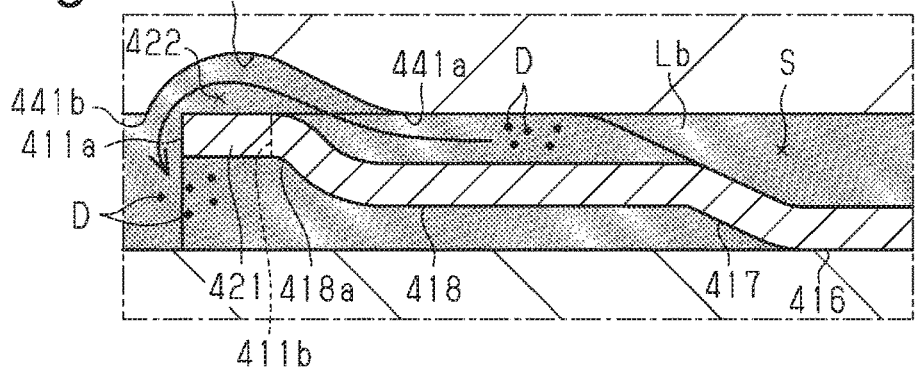
FIG. 15B is a partially enlarged view of FIG. 15A.

In each of the above-described embodiments and modifications, the protuberances 14, 114, 214, 314 may protrude radially inward from the outer circumferential surface of the main body 11, 111, 211, 311. For example, contrary to the tolerance ring 10 of the first embodiment, protuberances 414 may protrude radially inward from the outer circumferential surface of the main body 411 as shown in FIG. 14. FIGS. 15A and 15B show a case in which the tolerance ring 410 is fitted in an elastically deformed state between the outer circumferential surface of the shaft 430 and the inner circumferential surface of the sleeve 440, into which the shaft 430 is inserted. In this state, the ridge portions 416 of the protuberances 414 contact the inner circumferential surface of the sleeve 440 in the first embodiment. In contrast, the ridge portions 416 of the protuberances 414 contact the outer circumferential surface of the shaft 430 in this modification. The sleeve 440 of this modification is provided with large-inner-diameter portions 441 having a larger inner diameter than the other sections. That is, the inner circumferential surface of each large-inner-diameter portion 441 defines a groove having a depth in the radial direction of the sleeve 440. Further, the large-inner-diameter portions 441 are provided to face the ends 411a of the axial direction of the main body 411. Specifically, each large-inner-diameter portion 441 is arranged such that the passage sites 421 of the specific protuberances are located between ends 441a and 441b on the opposite ends in the axial direction. As a result, the end of each passage site 421, which is connected to the specific protuberance, that is, the end 418a of the extension 418 of the specific protuberance, is located between the ends 441a and 441b of the large-inner-diameter portion 441. The end 418a of each extension 418 is located closer to the second end 441b than to the first end 441a of the large-inner-diameter portions 441. Also, the second end 441b of the large-inner-diameter portion 441 is located on the side farther from the specific protuberance than the end 411a of the main body 411. That is, the end 418a of the extension 418 of the specific protuberance and the end 411a of the main body 411 are located between the ends 441a and 441b of the large-inner-diameter portion 441.

In such a shaft coupling structure, the gap between the inner circumferential surface of the large-inner-diameter portion 441 and the passage site 421 constitutes a communication passage 422, which connects the inside (the depression S) of the specific protuberance and the outside in the radial direction of the specific protuberance. In this case, if repeated slip rotations of the tolerance ring 410 occur between the tolerance ring 410 and the sleeve 440, wear debris D tends to accumulate between the tolerance ring 410 and the inner circumferential surface of the sleeve 440, especially inside the specific protuberances (the depressions S). However, in the process of the lubricant Lb flowing into or out of the specific protuberance through the communication passage 422, the wear debris D is discharged from the inside of the specific protuberance, for example, to the outside of the specific protuberance. In this manner, even if the protuberances 414 protrude radially inward in the main body 411, the same action and advantages as those of the above-described embodiments and modifications will be achieved.

Figure 16:
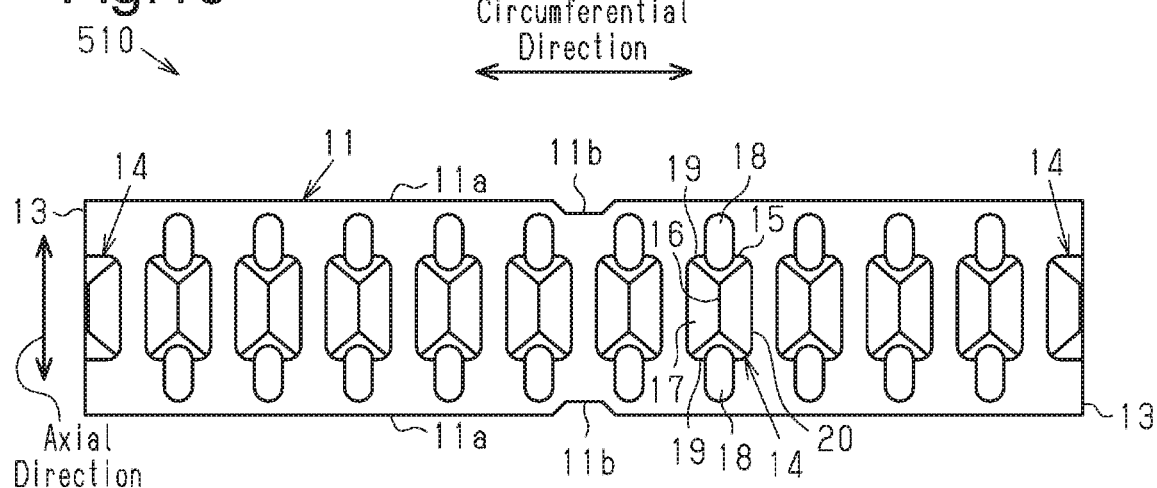
FIG. 16 is a front view showing a developed state of a tolerance ring of a modification.

In the first embodiment, the protuberances 14 may be arranged in the circumferential direction at predetermined intervals (equally spaced in FIG. 16) as shown in FIG. 16. Also, this arrangement can be similarly applied to the second embodiment, the third embodiment, and each of the modifications.

Figure 17:
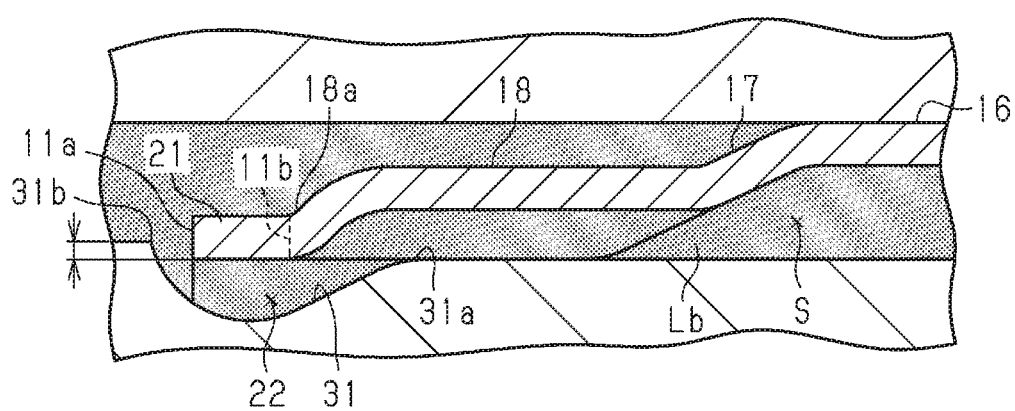
FIG. 17 is a cross-sectional view showing a specific protuberance of a tolerance ring of a modification.

In the first embodiment, one of the opposite ends 31a, 31b in the axial direction of each small-diameter portion 31 may be located radially inside the other end, so that a step is provided in the small-diameter portion 31. For example, as shown in FIG. 17, the circumferential surface of the shaft 30 continuous with the first end 31a of the small-diameter portion 31 may be made smaller in the diameter than the circumferential surface of the shaft 30 continuous with the second end 31b of the small-diameter portion 31, so as to form a step. In this case, if the tolerance ring 10 is fitted in an elastically deformed state between the outer circumferential surface of the shaft 30 and the inner circumferential surface of the sleeve 40, into which the shaft 30 is inserted, the movement of the tolerance ring 10 in the axial direction is limited by the step (second end 31b) provided in the small-diameter portion 31. This limits the displacement in the axial direction of the tolerance ring 10 in the use state of the tolerance ring 10. Since the tolerance ring 10 of the first embodiment has the notch 11b, adequate inflow and discharge of lubricant Lb into and out of the specific protuberances are ensured even if the tolerance ring 10 moves in the axial direction and abuts against the step (the second end 31b) provided in the small-diameter portion 31. Also, such a configuration may be employed in the second embodiment, the third embodiment, and the modifications that use the tolerance ring in which the protuberances protrude radially outward from the inner circumferential surface of the main body.

Figure 18:
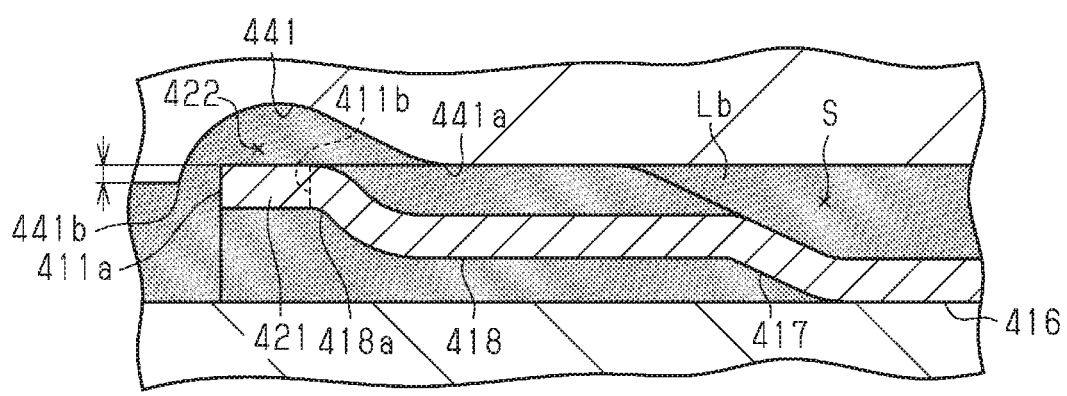
FIG. 18 is a cross-sectional view showing a specific protuberance of a tolerance ring of a modification.

In the modified embodiment shown in FIGS. 14, 15A, and 15B, one of the ends 441a, 441b in the axial direction of the large-inner-diameter portion 441 may be located radially outside the other so as to form a step in the large-inner-diameter portion 441. For example, as shown in FIG. 18, the circumferential surface of the sleeve 440 continuous with the first end 441a of the large-inner-diameter portion 441 may be made larger in the diameter than the circumferential surface of the sleeve 440 continuous with the second end 441b of the large-inner-diameter portion 441, so as to form a step. In this case, if the tolerance ring 410 is fitted in an elastically deformed state between the outer circumferential surface of the shaft 430 and the inner circumferential surface of the sleeve 440, into which the shaft 430 is inserted, the movement of the tolerance ring 410 in the axial direction is limited by the step (second end 441b) provided in the large-inner-diameter portion 441. This limits the displacement in the axial direction of the tolerance ring 410 in the use state of the tolerance ring 410. Since the tolerance ring 410 shown in FIGS. 14 to 15B has the notch 411b, adequate inflow and discharge of lubricant Lb into and out of the specific protuberances are ensured even if the tolerance ring 410 moves in the axial direction and abuts against the step (the second end 441b) provided in the large-inner-diameter portion 441. Also, such a configuration may be employed in each modification that uses the tolerance ring in which the protuberances protrude radially inward from the outer circumferential surface of the main body.

The invention claimed is:
1. A shaft coupling structure comprising:
a shaft;
a sleeve, into which the shaft is inserted; and
a tolerance ring, which includes
    a cylindrical main body, and
    a plurality of protuberances, which protrudes outward in a radial direction from an inner circumferential surface of the main body, wherein
the tolerance ring is fitted between an outer circumferential surface of the shaft and an inner circumferential surface of the sleeve, and
the shaft includes a small-diameter portion having a diameter smaller than other sections of the shaft,
an end of each protuberance and an end of the main body in an axial direction of the main body are located between opposite ends of the small-diameter portion in the axial direction,
at least one of the protuberances includes
    a first portion having a ridge portion, which contacts the inner circumferential surface of the sleeve, and a second portion, which is lower than the first portion, is continuous with the first portion, and extends toward the end of the main body, an end of the second portion is located between the opposite ends of the small-diameter portion in the axial direction, a communication passage that connects an inside and an outside of each protuberance is provided between the outer circumferential surface of the shaft and the main body, and the communication passage is constituted by a gap between an outer circumferential surface of the small-diameter portion and the main body.

2. The shaft coupling structure according to claim 1, wherein a manganese phosphate coating is provided on at least one of the inner circumferential surface and the outer circumferential surface of the main body.

3. A shaft coupling structure comprising:
a shaft;
a sleeve, into which the shaft is inserted; and
a tolerance ring, which includes
   a cylindrical main body, and
   a plurality of protuberances, which protrudes inward in a radial direction from an outer circumferential surface of the main body, wherein
the tolerance ring is fitted between an outer circumferential surface of the shaft and an inner circumferential surface of the sleeve, and the sleeve includes a large-inner-diameter portion having a diameter larger than other sections of the sleeve, an end of each protuberance and an end of the main body in an axial direction of the main body are located between opposite ends of the large-inner-diameter portion in the axial direction, at least one of the protuberances includes
   a first portion having a ridge portion, which contacts the outer circumferential surface of the shaft, and
   a second portion, which is lower than the first portion, is continuous with the first portion, and extends toward the end of the main body, an end of the second portion is located between the opposite ends of the large-inner-diameter portion in the axial direction, a communication passage that connects an inside and an outside of each protuberance is provided between the inner circumferential surface of the sleeve and the main body, and the communication passage is constituted by a gap between an inner circumferential surface of the large-inner-diameter portion and the main body.

4. The shaft coupling structure according to claim 3, wherein a manganese phosphate coating is provided on at least one of the inner circumferential surface and the outer circumferential surface of the main body.

* * * * *